INVENTOR.
JAMES F. ROUNSAVILLE
BY
William A. Wikesell Jr.
PATENT ATTORNEY 3,600,153
NH₄NO₃-KHSO₄ FERTILIZER COMPOSITION
James F. Rounsaville, Ponca City, Okla., assignor to
Continental Oil Company, Ponca City, Okla.
Filed Aug. 19, 1968, Ser. No. 753,349
Int. Cl. C05c 1/00
U.S. Cl. 71—59                                      3 Claims

ABSTRACT OF THE DISCLOSURE

Melt fertilizer comprising potassium bisulfate and ammonium nitrate is prepared by acidulating KCl or K₂SO₄, removing by-product HCl if formed, admixing the resulting potassium bisulfate with ammonium nitrate in the molten state to obtain a eutectic mixture of $NH_4NO_3$ and $KHSO_4$, which is cooled to the solid product. While in the molten state, the eutectic mixture may be ammoniated and/or granulated. Likewise other salts may be added to the molten mixture prior to its solidifying.

DISCLOSURE

Figure 1:
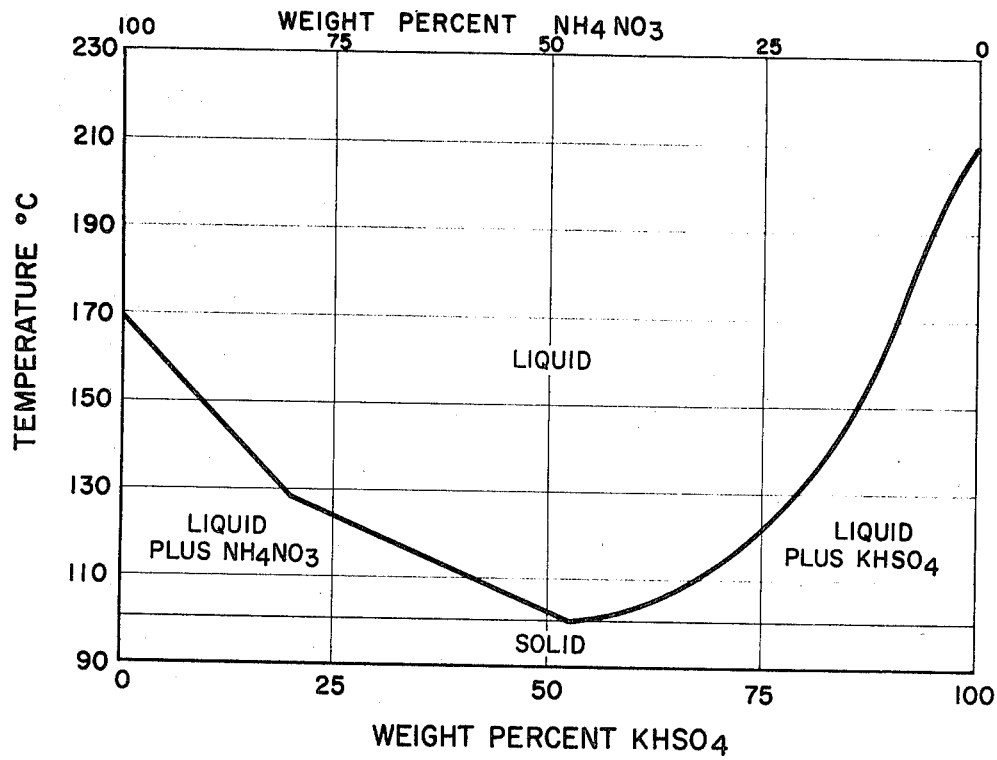

This invention relates to a novel fertilizer composition, and to a method for manufacturing same.

It is well recognized that potassium is one of the basic nutrients for a fertilizer or plant food, in addition to phosphorus and nitrogen. Further, sulfur is becoming recognized as a fourth essential element of plant food. Potassium occurs widely in nature, primarily in the forms of chloride and sulfate. However, many plants are sensitive to chloride, and thus naturally occurring potassium chloride is generally subjected to some treatment prior to its use in fertilizer.

It is an object of this invention to provide a novel fertilizer composition containing at least the nutrients N, K and S. Another object of the invention is to provide a method for preparing a fertilizer having high nutrient analysis, good physical characteristics, and a flexibility of grade.

Figure 2:
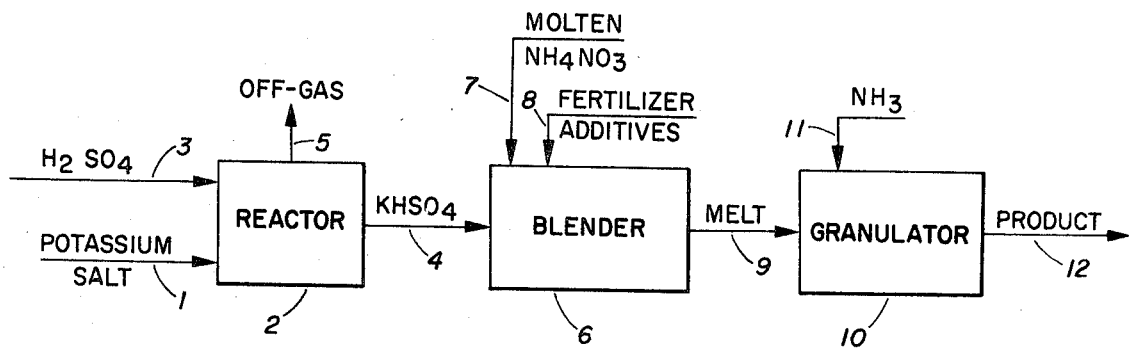

Other aspects, objects, and the several advantages of the invention will become apparent upon study of this disclosure, the appended claims, and the drawing, in which:

FIG. 1 represents the phase diagram for the binary system $KHSO_4$—$NH_4NO_3$, and FIG. 2 represents a schematic flow diagram of the method of the present invention.

According to the invention, it has been discovered that potassium bisulfate, $KHSO_4$, and ammonium nitrate in molten state form a simple eutectic system, the eutectic being at about 52 weight percent $KHSO_4$ and melting at only about 101° C. The molten mixtures are reasonably stable. It has further been discovered that fertilizers based on such molten mixtures can be formulated using a common potassium salt as a starting material and, in the case of using potassium chloride as a starting material, that the resulting fertilizer is relatively chloride-free.

Referring now to the drawing, FIG. 1 illustrates the phase diagram for the system $KHSO_4$—$NH_4NO_3$. As can be seen, the eutectic mixture at about 52 weight percent $KHSO_4$ melts at about 101° C. The melting point of pure ammonium nitrate is about 169.6° C., and that of pure $KHSO_4$ about 210° C. Two-component compositions of the desired concentration can be prepared by simply heating a mixture of the two solids, in appropriate amounts, to above the melting point, and then cooling to below 101° C.; the molten mixture can be prilled, granulated, or otherwise treated prior to cooling. Such a two-component mixture will contain the following nutrient values, assuming pure food components, where y is the weight fraction of $KHSO_4$: percent N=35−35y, percent K₂O=34.6y, and percent S=23.5y. The two-component mixture can be ammoniated, as will be further explained later herein, and in the event of such ammoniation in stoichiometric amount, the nutrient values will be:

percent N=(35−24.8y)/(1+0.124y)

percent K₂O=34.7y/(1+0.124y)

and percent S=23.5y/(1.0124y)

Other salts of fertilizer value, such as potassium sulfate, potassium nitrate, monopotassium phosphate, monoammonium phosphate, ammonium bisulfate, and ammonium polyphosphate, can be dissolved or suspended in the binary melt, and subsequently processed into suitable fertilizer form, although of course the equations just given for nutrient value content will not be valid in such instances.

Attention is now directed to FIG. 2, which illustrates schematically an integrated fertilizer process of the present invention. According to the invention, a potassium salt capable of being digested with a mineral acid provides the potassium source of the fertilizer product. The preferred salts, because of their availability, are potassium chloride and potassium sulfate. This salt is introduced via conduit 1 to a reactor 2. The main product desired from reactor 2 is potassium bisulfate, $KHSO_4$, along with other salts soluble in molten ammonium nitrate if desired. Acid is introduced by way of conduit 3, and either the acid or the potassium salt must include sulfate ion to form the desired $KHSO_4$. Thus, although sulfuric acid is preferred, it can be used in admixture with other acids, and in the event of using $K_2SO_4$ as the potassium salt, sulfuric acid need not be used at all, other suitable acids for converting $K_2SO_4$ to $KHSO_4$ including nitric and phosphoric. Potassium salt by way of conduit 1 and acid by way of conduit 3 should be used in about the proper stoichiometric amounts to yield the desired $KHSO_4$ by way of conduit 4. Certain reactants, for example potassium chloride and sulfuric acid, yield also a gaseous by-product, in this instance hydrogen chloride, which is removed from reactor 2 by way of conduit 5. Reactor 2 can preferably comprise simply a vessel containing one or more agitators.

From reactor 2, the $KHSO_4$ is passed by way of conduit 4 to a blending zone 6, wherein it is mixed with the desired amount of ammonium nitrate introduced by way of conduit 7. The ammonium nitrate can be introduced in the solid state, but it is preferably introduced as a melt. Blender 6 can comprise a vessel with one or more agitators, or other suitable blending equipment such as a pug mill. Minor amounts of other fertilizer salts, such as monoammonium phosphate, monopotassium phosphate, or phosphoric acid, can be added to the melt in blender 6 by way of conduit 8.

The melt produced in blender 6 is then passed by way of conduit 9 to a finishing operation, which can comprise a granulator or a prilling operation 10. If a granulator is used, the product can be ammoniated therein, which process is known in the art, with ammonia introduced by way of conduit 11. Cooling of the melt to the solid state also occurs in vessel 10.

Product removed by way of conduit 12 is of high analysis, can be tailored over a wide range of grades, and has good physical characteristics including intimate admixture of the components. A chloride-free fertilizer can be made without the use of water during granulation.

The invention will now be further illustrated by reference to the following examples.

Example 1

One hundred and forty-four parts of $KHSO_4$ are added to 100 parts of molten $NH_4NO_3$. The temperature is allowed to fall to 120° C. as the KHSO₄ dissolves. The melt is granulated in an ammoniator-granulator to give a solid product which has a grade of 19-0-19. The resulting solid is relatively hard and less deliquescent than ammonium nitrate.

Example 2

Thirty-seven parts of $KHSO_4$ are added to 100 parts of molten $NH_4NO_3$. The temperature is allowed to fall to 140° C. as the $KHSO_4$ dissolves. The melt is granulated in an ammoniator-granulator to give a solid product with a grade of 27-0-9.

Example 3

Seventy-four parts of KCl are added to 100 parts of 97% sulfuric acid. The mixture is heated until all of the HCl and most of the water have been driven off. Twenty-eight parts of $NH_4NO_3$ are added to the resulting melt of $KHSO_4$. The melt is cooled to 170° C. and granulated to give a solid product.

Example 4

Two hundred parts of $KHSO_4$ and 112 parts of $NH_4H_2PO_4$ are added to 100 parts of molten $NH_4NO_3$. The temperature is kept about 150° C. The resultant melt is granulated in an ammoniator-granulator to give a solid product with a grade of 15.8-15.8-15.8. The ammoniation is carried out until the pH of a water solution of the product has a pH of 4. The resulting solid is hard and stores well. This solid consists of $NH_4NO_3$, $(NH_4)_2SO_4$, $K_2SO_4$, and $NH_4H_2PO_4$.

Example 5

Seventy-one parts of $KHSO_4$ and 40 parts of $NH_4H_2PO_4$ are added to 100 parts of molten $NH_4NO_3$. The temperature of the melt is kept about 150° C. The melt is granulated in an ammoniator-granulator to give a solid with grade 22-11-11. The solid consists of $NH_4NO_3$, $(NH_4)_2SO_4$, $K_2SO_4$, $NH_4H_2PO_4$, and $(NH_4)_2HPO_4$.

Example 6

Seventy-one parts of $KHSO_4$ and 45 parts of merchant acid (54% $P_2O_5$) are added to 100 parts of molten $NH_4NO_3$. The temperature of the melt is kept about 150° C. The melt is granulated in an ammoniator-granulator to give a solid with grade 22-11-11.

Example 7

Ninety-two parts of $K_2SO_4$ and 53 parts of 97% $H_2SO_4$ are heated to 150° C. and mixed well. The resulting solids are added to 100 parts of molten $NH_4NO_3$. The temperature is allowed to fall to 120° C. as the $KHSO_4$ dissolves. The melt is granulated in an ammoniator-granulator to give a solid product of $NH_4NO_3$—$K_2SO_4$—$(NH_4)_2SO_4$ which has a grade of 19-0-19. The resulting solid is relatively hard and less deliquescent than $NH_4NO_3$.

Example 8

Fourteen parts of nitric acid (60%) and 16 parts of phosphoric acid (85%) are added to 47 parts of $K_2SO_4$. The resulting solid is heated to drive off excess water and added to a melt of 46 parts of $NH_4H_2PO_4$ and 100 parts of $NH_4NO_3$. The resulting melt is allowed to cool to 150° C. as the solids dissolve. The melt is granulated in an am-moniator-granulator to give a solid with grade 22-17-11. The solid has the N, P, and K uniformly distributed in each hard granule.

In order to demonstrate the solubility of various other fertilizer salts in the melt, a melt of 50 weight percent $KHSO_4$ and 50 weight percent $NH_4NO_3$ at 170° C. was made up. For comparison, solubilities of the salts in pure $NH_4NO_3$ is also included.

| Salt | Solubility in $NH_4NO_3$—$KHSO_4$ wt. percent | Solubility in $NH_4NO_3$, wt. percent |
| --- | --- | --- |
| $K_2SO_4$ | 15 | 0 |
| $KNO_3$ | 10 | 16 |
| $KH_2PO_4$ | 10 | 21 |
| KCl | (¹) | 16 |
| $NH_4H_2PO_4$ | 50 | 50 |
| $NH_4HSO_4$ | (²) | (²) |
| Ammonium polyphosphate ³ | (²) | (²) |

¹ Reacts to evolve gas.
² Completely miscible.
³ TVA's 16.0-61.6-0 from furnace acid.

Except for $K_2SO_4$ the solubility of potassium salts is reduced upon addition of $KHSO_4$ to $NH_4NO_3$. However, addition of $KHSO_4$ to $NH_4NO_3$ appears to increase the solubility of ammonium salts. The large solubility of $NH_4H_2PO_4$ (or its precursor $H_3PO_4$) would allow addition of phosphate to this melt.

Although this invention has been described with respect to particular embodiments thereof, it is not to be so limited, as changes and modifications may be made therein which are within the spirit and scope of the invention as defined by the appended claims.

What is claimed is:

1. A fertilizer composition comprising a solid solution containing a eutectic mixture of ammonium nitrate and potassium bisulfate, said eutectic mixture containing about 52 weight percent potassium bisulfate and about 48 weight percent ammonium nitrate and having a melting point of about 101° C.

2. The composition of claim 1 further characterized by being ammoniated while in its molten state.

3. The composition of claim 2 further including a minor amount of a salt selected from the group consisting of potassium sulfate, potassium nitrate, monopotassium phosphate, monoammonium phosphate, ammonium bisulfate, and ammonium polyphosphate.

References Cited

UNITED STATES PATENTS

| 1,754,358 | 4/1930 | Griessbach et al. | 23—121 |
| 3,490,892 | 1/1970 | Simpson | 71—43 |

FOREIGN PATENTS

| 295,825 | 8/1928 | Great Britain | 71—59 |
| 328,620 | 4/1930 | Great Britain | 71—59 |
| 697,916 | 11/1930 | France | 71—59 |
| 908,640 | 10/1945 | France | 71—59 |

SAMIH N. ZAHARNA, Primary Examiner

B. H. LEVENSON, Assistant Examiner

U.S. Cl. X.R.

71—60